United States Patent
Bohannon et al.

(10) Patent No.: US 12,254,081 B2
(45) Date of Patent: Mar. 18, 2025

(54) VERIFICATION OF SERVERLESS APPLICATIONS USING FUZZING TECHNIQUES

(71) Applicant: BLACK DUCK SOFTWARE, INC., Mountain View, MA (US)

(72) Inventors: David Autrey Bohannon, Sugar Hill, GA (US); Ksenia A. Peguero, Herndon, VA (US); Benjamin D. Sedat, San Francisco, CA (US)

(73) Assignee: Black Duck Software, Inc., Burlington, MA (US)

( * ) Notice: Subject to any disclaimer, the term of this patent is extended or adjusted under 35 U.S.C. 154(b) by 91 days.

(21) Appl. No.: 17/972,353

(22) Filed: Oct. 24, 2022

(65) Prior Publication Data

US 2024/0134962 A1 Apr. 25, 2024
US 2024/0232329 A9 Jul. 11, 2024

(51) Int. Cl.
G06F 11/36 (2006.01)
G06F 11/3604 (2025.01)
G06F 21/52 (2013.01)

(52) U.S. Cl.
CPC .......... *G06F 21/52* (2013.01); *G06F 11/3604* (2013.01); *G06F 2221/033* (2013.01)

(58) Field of Classification Search
CPC ........................................................ G06F 11/36
See application file for complete search history.

(56) References Cited

U.S. PATENT DOCUMENTS

| | | | | |
|---|---|---|---|---|
| 2013/0346965 A1* | 12/2013 | Conlan | ............... | G06Q 30/0601 717/178 |
| 2017/0026488 A1* | 1/2017 | Hao | ........................ | H04L 67/60 |
| 2019/0370237 A1* | 12/2019 | Cheru | ............... | G06F 16/24573 |
| 2021/0044617 A1* | 2/2021 | Lekies | ................... | G06F 21/577 |
| 2023/0102025 A1* | 3/2023 | Ishida | ................... | H04L 67/289 709/219 |

* cited by examiner

*Primary Examiner* — Jae U Jeon
(74) *Attorney, Agent, or Firm* — Patterson + Sheridan, LLP (57) ABSTRACT

A method of verifying an application includes downloading source code for a first function exposed by the application and parsing the source code to determine an input object of the first function. The method also includes injecting a first fuzzing payload into the input object to generate a test object, invoking the first function using the test object, and determining whether the first function includes a vulnerability by analyzing a response to invoking the first function using the test object.

20 Claims, 8 Drawing Sheets

VERIFICATION OF SERVERLESS APPLICATIONS USING FUZZING TECHNIQUES

TECHNICAL FIELD

The present disclosure relates to serverless applications or cloud applications. Specifically, certain embodiments relate to the testing and verification of serverless applications or cloud applications.

BACKGROUND

Serverless computing is a cloud technology common in microservices-oriented architectures that allows developers to deploy and run code in a shared cloud computing environment without the overhead of provisioning and managing servers on which the code is deployed. The code is organized as a function that is invoked by other cloud resources (e.g., an application programming interface (API) gateway). Cloud computing services provide a management API to administer and control cloud resources, including serverless functions.

SUMMARY

The present disclosure describes systems and methods for verification of serverless applications using fuzzing techniques. According to an embodiment, a method of verifying an application includes downloading source code for a first function exposed by the application and parsing the source code to determine an input object of the first function. The method also includes injecting a first fuzzing payload into the input object to generate a test object, invoking the first function using the test object, and determining whether the first function includes a vulnerability by analyzing a response to invoking the first function using the test object.

Downloading the source code and invoking the first function using the test object may be initiated through a management API rather than through a gateway that exposes the first function.

The method may include retrieving a list identifying a plurality of functions exposed by the application and downloading source code for the plurality of functions. Downloading the source code for the first function may be performed when downloading the source code for the plurality of functions.

Downloading the source code for the first function may include communicating a request for information about the first function and receiving a response object to the request. The response object may include a code location. Downloading the source code for the first function may also include requesting the source code for the first function from the code location.

Determining the input object comprises detecting the input object identified in the source code may use dot notation or bracket notation.

The method may include determining an attribute of the input object and a first type for the attribute and generating the first fuzzing payload by setting the attribute in the first fuzzing payload as a second type different from the first type.

The response to invoking the first function using the test object may include a response body, a response header, and a response latency. Determining whether the first function includes a vulnerability may be based on one or more of the response body, the response header, and the response latency.

The method may include determining a second function called by the first function based on analyzing the response to invoking the first function using the test object and invoking the second function using a second fuzzing payload.

According to another embodiment, a system for verifying an application includes a memory and a processor communicatively coupled to the memory. The processor retrieves a list identifying a plurality of functions exposed by the application and downloads source code for the plurality of functions. The processor also parses the source code to determine an input object of a first function of the plurality of functions and injects a first fuzzing payload into the input object to generate a test object. The processor further invokes the first function using the test object and determines whether the first function includes a vulnerability by analyzing a response to invoking the first function using the test object.

Downloading the source code and invoking the first function using the test object may be initiated through a management API rather than through a gateway that exposes the first function.

Downloading the source code for the first function may include communicating a request for information about the first function and receiving a response object to the request. The response object may include a code location. Downloading the source code may also include requesting the source code for the first function from the code location.

Determining the input object may include detecting the input object identified in the source code using dot notation or bracket notation.

The processor may determine an attribute of the input object and a first type for the attribute and generate the first fuzzing payload by setting the attribute in the first fuzzing payload as a second type different from the first type.

The response to invoking the first function using the test object may include a response body, a response header, and a response latency. Determining whether the first function includes a vulnerability may be based on one or more of the response body, the response header, and the response latency.

The processor may determine a second function called by the first function based on analyzing the response to invoking the first function using the test object and invoke the second function using a second fuzzing payload.

According to another embodiment, a non-transitory, computer readable medium stores instructions that, when executed, cause a processor to download source code for a plurality of functions exposed by an application and parse the source code to determine an input object of a first function of the plurality of functions. The processor also injects a first fuzzing payload into the input object to generate a test object and invokes the first function using the test object. The processor further receives a response to invoking the first function using the test object. The response includes a response body, a response header, and a response latency. The processor also determines whether the first function includes a vulnerability based on one or more of the response body, the response header, and the response latency.

Downloading the source code and invoking the first function using the test object may be initiated through a management API rather than through a gateway that exposes the first function.

The instructions may further cause the processor to retrieve a list identifying a plurality of functions exposed by the application. Downloading the source code for the plurality of functions may be based on the list.

Downloading the source code for the first function may include communicating a request for information about the first function and receiving a response object to the request. The response object may include a code location. Downloading the source code may also include requesting the source code for the first function from the code location.

Determining the input object may include detecting the input object identified in the source code using dot notation or bracket notation.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to verification of software applications using fuzzing techniques. Serverless applications or cloud applications are deployed in shared, cloud computing environments. The code for these applications is typically organized as functions that are invoked by other cloud resources (e.g., an application programming interface (API) gateway). It is common, however, for an application to have hundreds of deployed functions, with only a small subset of those directly accessible from the external network through an API gateway. This makes dynamic testing of the application challenging because these internal functions remain hidden and inaccessible.

One approach to dynamically test an application is fuzzing, where malformed or unexpected inputs are used to trigger a vulnerability in the application, often identified by an error or crash. Existing techniques for fuzzing serverless applications test functions of the applications that are exposed to the public network, generally through an API gateway, so that external tools can interact with the functions. These techniques rely on an inventory of all functions (including internal functions) of the applications and the expected inputs for the functions. This information may not be readily available or may not be accurate. Even if all internal functions are identified and exposed to the external network, these techniques still have considerable limitations that prevent the fuzzing techniques from delivering complex payloads (as they may break upstream resources), manipulating internal objects passed to the function, inspecting raw function response data, and identifying errors in downstream resources due to masked response messages.

The present disclosure describes a system that tests and verifies software applications using fuzzing. The system may connect to the cloud provider's management API to issue instructions directly to a cloud server or device hosting an application. In this manner, the system bypasses an API gateway when interacting with the cloud server or device. The system may retrieve a list of the functions implemented by the application and retrieve the source code for these functions. The system then analyzes the source code to determine the input objects expected by the various functions. The system may use this information to generate fuzzing payloads for these functions. For example, the system may generate input objects that include malformed or unexpected attributes and parameters. The system may then invoke the functions using these input objects to see if the fuzzing payloads expose vulnerabilities in the functions.

The described system provides several technical advantages in certain embodiments. For example, the system may identify or determine every function implemented by an application, including internal or hidden functions. The system may not need to have the functions of the application identified (e.g., by an inventory) for the system prior to testing. As another example, the system may approximate the structure of the input objects expected by the functions, which allows the system to generate better fuzzing payloads that provide better test coverage. As a result, the system may discover vulnerabilities that existing testing systems may miss. Additionally, the system may expend less computing resources (e.g., processor, memory, and network resources) generating and communicating wasteful fuzzing payloads that do not test or minimally test the functions of the application.

Figure 1:
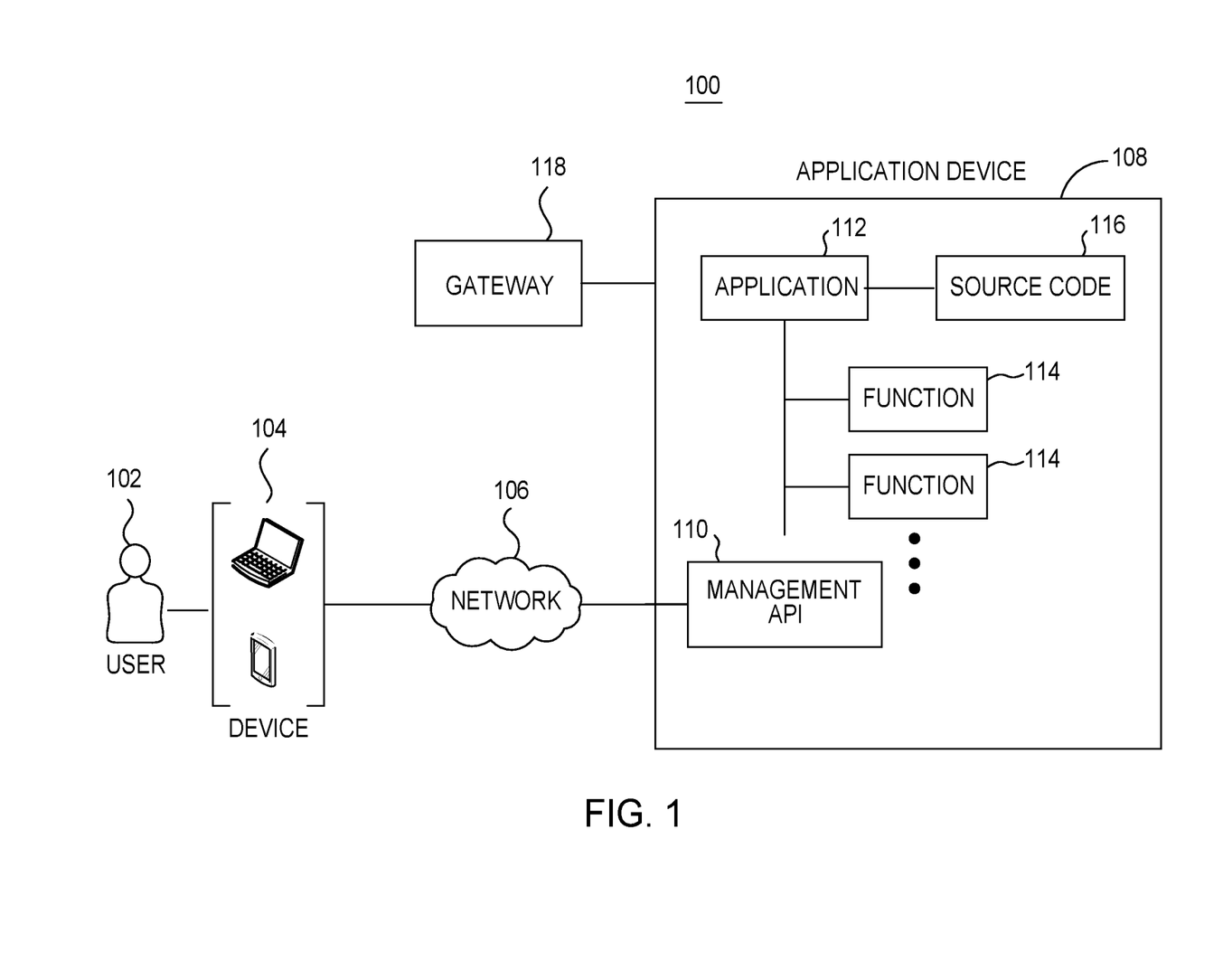
FIG. 1 illustrates an example system.

FIG. 1 illustrates an example system 100. As seen in FIG. 1, the system 100 includes one or more devices 104, a network 106, and an application device 108. Generally, the application device 108 may be part of a cloud environment that hosts software applications that the device 104 may access through a network connection to a management API 110. The device 104 may use fuzzing techniques to test these applications for vulnerabilities. In certain embodiments, the device 104 retrieves the source code for an application to determine input objects expected by the application. The device 104 uses the expected inputs to generate fuzzing payloads that include malformed or unexpected inputs. The device 104 then sends the fuzzing payloads to the application to test the response of the application and to detect whether the application includes vulnerabilities. As a result, the device 104 may generate and use fuzzing payloads that provide better test coverage relative to existing techniques that do not detect the input objects expected by the application.

Figure 8:
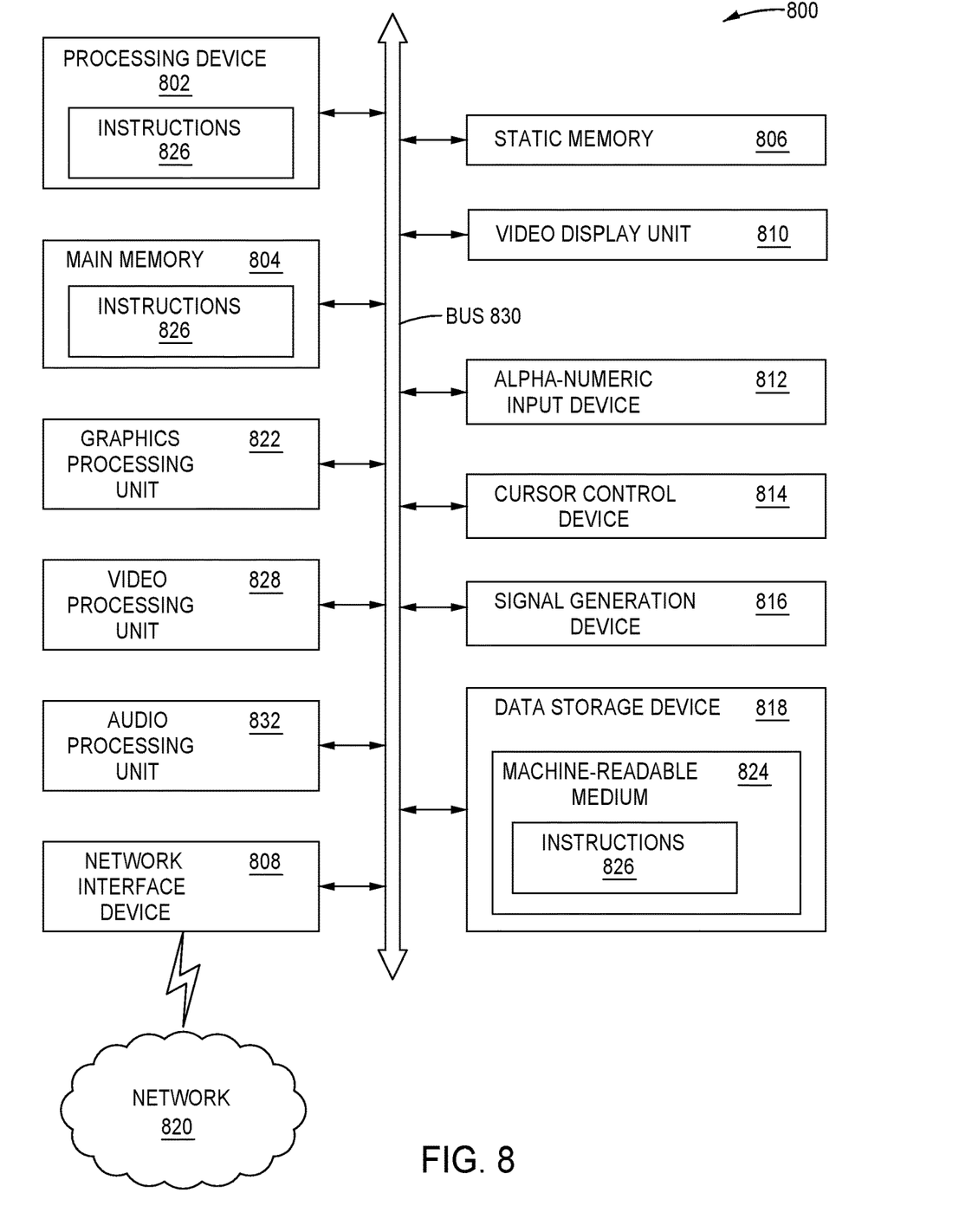
FIG. 8 depicts a diagram of an example computer system in which embodiments of the present disclosure may operate.

The device 104 may be a computer system (e.g., the computer system 800 shown in FIG. 8). A user 102 may use the device 104 to issue instructions to the application device 108. For example, the device 104 may issue instructions to identify the functions of an application hosted on the application device 108. As another example, the device 104 may issue instructions to retrieve source code for one or more of the functions exposed by the application device 108. The device 104 may also issue instructions with fuzzing payloads to invoke one or more of the functions of the application to detect vulnerabilities in the functions.

In certain embodiments, the device 104 issues the instructions to the application device 108 through a network connection to the management API 110. The management API 110 communicates directly with applications hosted on the application device 108. In this manner, the device 104 has additional access to the functions of the application and to the application device 108 relative to other devices that access the application device 108 or the application through an API gateway 118. For example, the API gateway 118 may limit the number of functions of an application that are exposed to the device. As another example, the API gateway 118 may prevent a device from performing certain actions (e.g., retrieving the source code for certain functions of the application). As yet another example, the API gateway 118 may mask response data or error messages returned by a function. By using the management API 110, the device 104 may bypass the API gateway 118 when issuing instructions to the application device 108.

The device 104 may issue an instruction to retrieve a list of functions of an application hosted on the application device 108. The instruction may identify the application and include a request for every function of the application, including internal functions that are not necessarily exposed through the API gateway 118. When the application device 108 receives the instruction, the application device 108 may respond with a list of every function of the identified application. The device 104 may analyze the list of functions to determine one or more functions to be tested. The device 104 may then communicate an instruction to the application device 108 to retrieve the source code for the functions to be tested. The application device 108 may then retrieve the source code and communicate the source code to the device 104.

The device 104 may analyze the source code to determine input objects expected by the functions. For example, the device 104 may determine various attributes of the input objects expected by the functions. The device 104 may then use this information to generate fuzzing payloads that include malformed or unexpected inputs. For example, if a function expected a string input, the device 104 may generate a fuzzing payload that includes an integer input. As another example, if a function expected an input object that includes an email address, the device 104 may generate a fuzzing payload that includes an incorrectly formatted email address. The device 104 may then invoke the function using the fuzzing payload to test the response of the function to unexpected input. The device 104 may analyze the response of the function to detect if the fuzzing payload exposed a security vulnerability in the function. In this manner, the device 104 detects security vulnerabilities of the application device 108 or the application, which may improve the security of the system 100.

The device 104 is any suitable device for communicating with components of the application device 108 over the network 106. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The device 104 may be a wearable device such as a virtual reality or augmented reality headset, a smart watch, or smart glasses. The device 104 may also include a user interface, such as a display, a microphone, keypad, or other appropriate terminal equipment usable by the user 102. The device 104 may include a hardware processor, memory, or circuitry configured to perform any of the functions or actions of the device 104 described herein. For example, a software application designed using software code may be stored in the memory and executed by the processor to perform the functions of the device 104.

The network 106 is any suitable network operable to facilitate communication between the components of the system 100. The network 106 may include any interconnecting system capable of transmitting audio, video, signals, data, messages, or any combination of the preceding. The network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The application device 108 may be a collection of computer systems (e.g., the computer system 800 shown in FIG. 8) in a cloud environment that hosts one or more software applications 112. One or more devices 104 in the system 100 may communicate instructions to the application device 108 through a management API 110 to invoke one or more functions 114 supported or exposed by the application 112. The instruction may include input objects expected by the function 114. The application device 108 may then invoke the function 114 and supply the provided input object to the function 114. The function 114 may execute and generate a response. The application device 108 communicates the response back to the device 104 so that the device 104 may see the results of the execution of the function 114.

The management API 110 may be a network interface exposed to the network 106. The management API 110 may allow administration of the resources deployed on the application device 108. For example, the management API 110 may allow instructions to be issued against certain functions 114 of the application 112 even though those functions 114 are not necessarily exposed by the API gateway 118. As another example, the management API 110 may communicate certain response messages or error messages from the functions 114 even though the API gateway 118 may typically suppress these messages. The management API 110 may receive instructions from the device 104 over the network 106. The management API 110 may then execute these instructions on the application device 108.

The application device 108 also may host or retrieve source code 116 for the application 112. For example, the application device 108 may host or retrieve the source code 116 for any of the functions 114 supported or exposed by the application 112. In some embodiments, the source code 116 is stored in a separate data storage device, and the application device 108 retrieves the source code 116 from the database. The device 108 may request the source code 116 for one or more functions 114 from the application device 108. In response, the application device 108 retrieves and sends the requested source code 116 to the device 104. The device 104 may then analyze the source code 116 to determine input objects expected by the functions 114. The device 104 may then generate fuzzing payloads using the information about the expected input objects.

Figure 2:
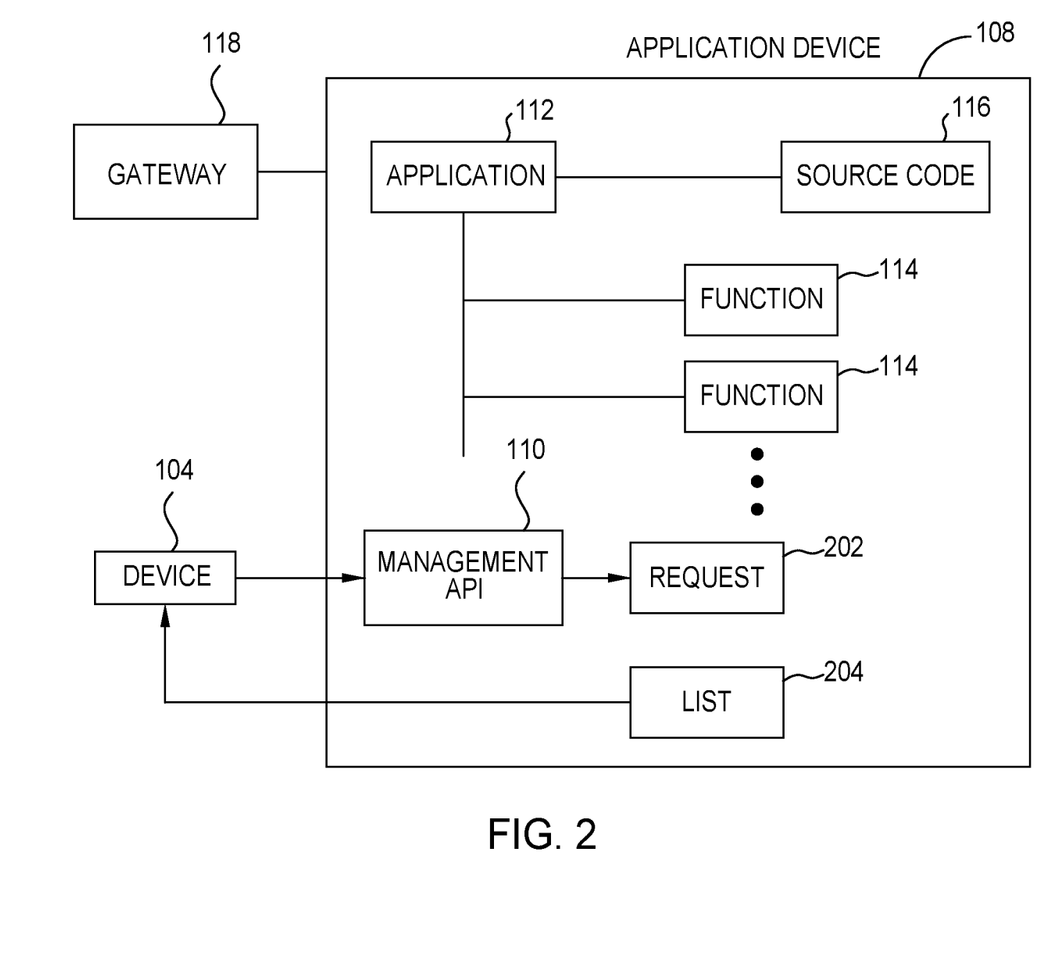
FIG. 2 illustrates an example device and application device identifying the functions of an application in the system of FIG. 1.

FIG. 2 illustrates an example device 104 and application device 108 identifying the functions 114 of an application 112 in the system 100 of FIG. 1. As seen in FIG. 2, the device 104 generates and communicates a request 202 to the application device 108 using the management API 110. For example, a user 102 may input a command into the device 104, and in response, the device 104 generates and communicates the request 202 to the application device 108 through the management API 110. Because the request 202 was generated and communicated through the management API 110, the request 202 bypasses the API gateway 118 that is typically used to interact with the application device 108 or the application 112. The request 202 may include an identifier for the application 112. The device 104 may use the request 202 to request the functions 114 supported or exposed by the application 112.

The application device 108 receives the request 202 and determines the application 112 identified in the request 202. In response, the application device 108 generates a list 204 that identifies each function 114 supported or exposed by the application 112. The list 204 may identify the functions 114 that are exposed through the API gateway 118 and the functions 114 that are not exposed through the API gateway 118. For example, the list 204 may identify functions 114 that are internal functions that are not exposed by the API gateway 118 and are instead called or invoked by other functions 114 of the application 112 when those other functions 114 are executing. The list 204 may include an identifier for each function 114, such as a handler and a location (e.g., a uniform resource identifier (URI)) where the source code 116 for the function 114 is stored. The application device 108 communicates the list 204 back to the device 104. The device 104 may then use the list 204 to determine the functions 114 of the application 112 to test.

Figure 3:
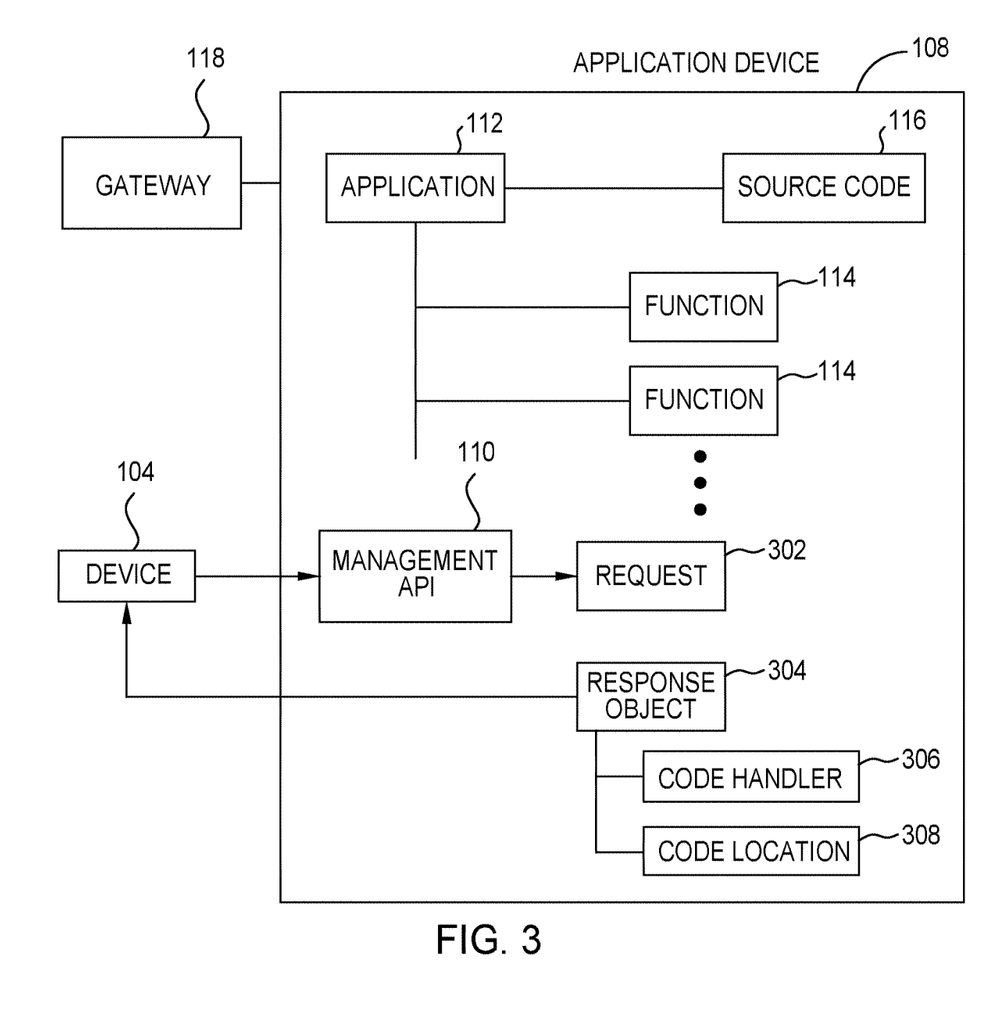
FIG. 3 illustrates an example device and application device communicating information for a function in the system of FIG. 1.

FIG. 3 illustrates an example device 104 and an application device 108 communicating information about a function 114 in the system 100 of FIG. 1. Generally, the actions and features shown in FIG. 3 occur after the device 104 has received the list 204 that identifies the functions 114 supported or exposed by the application 112 (shown in FIG. 2). As seen in FIG. 3, the device 104 generates and communicates a request 302 to the application device 108 using the management API 110. For example, a user 102 may input a command into the device 104, and in response, the device 104 generates and communicates the request 302 to the application device 108 through the management API 110. As a result, the request 302 bypasses the API gateway 118. The request 302 may include identifiers of the functions 114 to be tested. A user 102 may have selected the functions 114 to be tested, and the device 104 may generate the request 302 to identify the selected functions 114. The application device 108 may analyze the request 302 to determine which of the functions 114 of the application 112 are to be tested.

The application device 108 generates a response object 304 for the functions 114 identified in the request 302. The response object 304 includes information about the identified functions 114. In the example of FIG. 3, the response object 304 includes a code handler 306 and a code location 308 for each function 114 identified in the request 302. The code handler 306 for a function 114 is a method in the code of the function 114 that processes event and context data. When the function 114 is invoked, the method in the code handler 306 is run or executed. The code location 308 is a URI that identifies the location where the source code 116 for the function 114 is stored or located. If a request for the source code 116 of the function 114 is communicated to the code location 308, then the source code 116 for the function 114 will be returned. The application device 108 communicates the response object 304 back to the device 104. The device 104 may analyze the information in the response object 304 to retrieve further information about the functions 114 to be tested.

Figure 4:
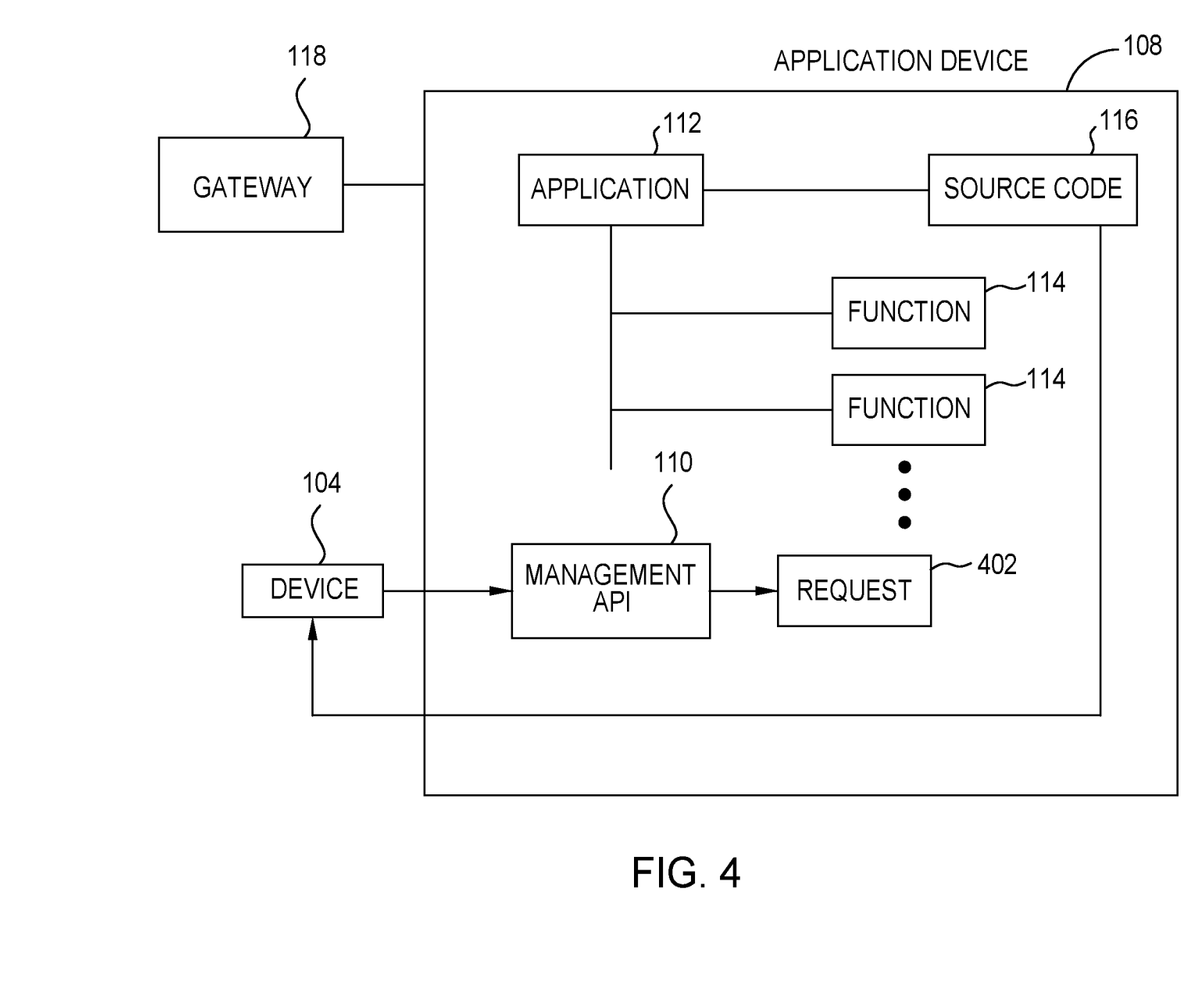
FIG. 4 illustrates an example device and application device communicating source code for a function in the system of FIG. 1.

FIG. 4 illustrates an example device 104 and an application device 108 communicating source code 116 for a function 114 in the system 100 of FIG. 1. Generally, the actions or features shown in FIG. 4 are performed after the device 104 receives the response object 304 from the application device 108 (shown in FIG. 3). As seen in FIG. 4, the device 104 generates and communicates a request 402 to the application device 108 using the management API 110. For example, a user 102 may input a command into the device 104, and in response, the device 104 generates and communicates the request 402 to the application device 108 through the management API 110. As a result, the request 402 bypasses the API gateway 118. The request 402 may include a request for the source code 116 of a function 114. The request 402 may also identify a location where the source code 116 is stored. The device 104 may have determined this location using the code location 308 in the response object 304 (shown in FIG. 3). The device 104 may communicate the request 402 to any suitable component. Generally, the device 104 may communicate the request 402 to a URI indicated by the code location 308 in the response object 304. For example, the device 104 may communicate the request 402 to a storage device that stores the source code 116. As another example, the device 104 may communicate the request 402 to the application device 108. In response to the request 402, the application device 108 may retrieve the source code 116 for the function 114. The device 104 may analyze the source code 116 to determine input objects expected by the function 114 when invoked.

Figure 5:
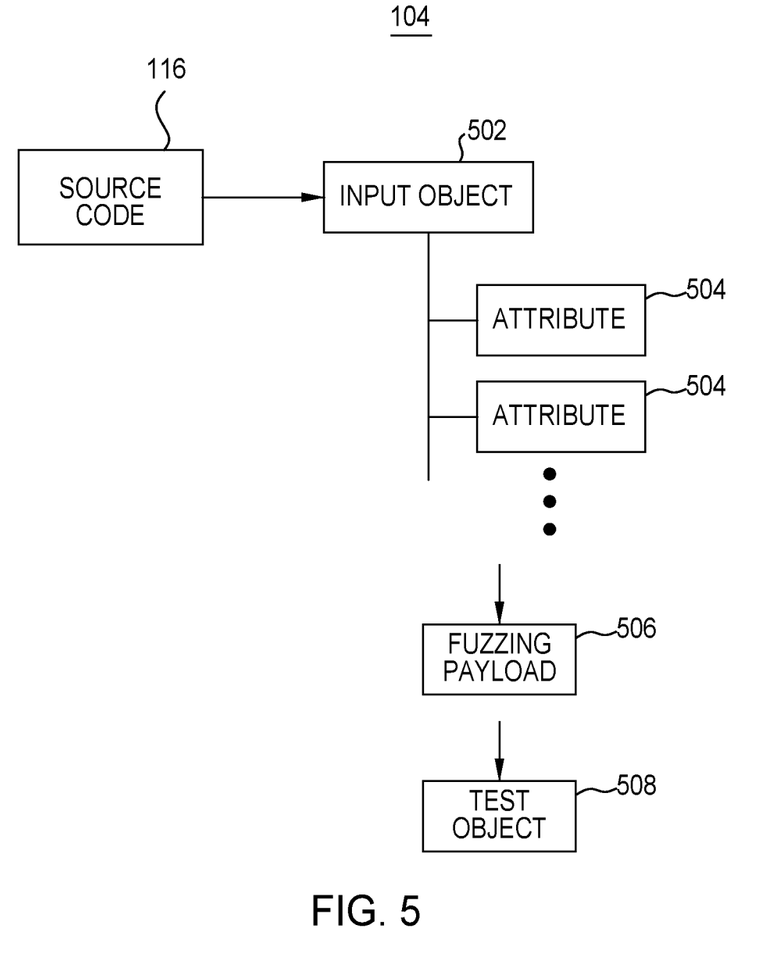
FIG. 5 illustrates an example device generating a test object in the system of FIG. 1.

FIG. 5 illustrates an example device 104 generating a test object in the system 100 of FIG. 1. Generally, the actions or features shown in FIG. 5 are performed after the device 104 receives the source code 116 from the application device 108 (shown in FIG. 4). As seen in FIG. 5, the device 104 analyzes the source code 116 for a function 114 to determine the input objects 502 expected by the function 114 when the function 114 is invoked. An input object 502 may include one or more attributes 504. The attributes 504 of the input object 502 may be indicated in the source code 116 using particular syntax or notations. For example, each attribute 504 and input object 502 may be indicated in the source code 116 using dot notation, where the name of the attribute 504 is separated from the name of the input object 502 by a period, by bracket notation, where the name of the attribute 504 is separated from the name of the input object 502 by brackets, or by "getter" methods where the name of the attribute 504 is the argument provided to the method. The device 104 may parse the source code 116 to detect the name of the input object 502 and the names of the attributes 504 of the input object 502. The device 104 may identify the names of the input objects by inspecting the arguments provided to the code handler 306 and the names of the attributes 504 for those objects by inspecting the names separated by dots or brackets, or passed as arguments to "getter" methods. In this manner, the device 104 determines the approximate structure of the input object 502 from the attributes 504 that are expected by the function 114 when the function 114 is invoked.

The device 104 then generates a fuzzing payload 506 using the information about the input object 502 and the attributes 504. Generally, the fuzzing payload 506 includes malformed or unexpected inputs that can be used to test the response of the function 114. For example, each attribute 504 may be of a certain datatype such as a string or an integer. As a result, the function 114 may expect these datatypes to be provided when the function 114 is invoked. To generate the fuzzing payload 506, the device 104 may provide information of a different datatype in place of the expected datatype to test the response of the function 114. For example, if an attribute 504 is an integer, the device 104 may provide a different datatype, such a string, for that attribute 504. The device 104 may then test the response of the function 114 to the incorrect datatype being provided. As another example, some attributes 504 may have a certain format. The function 114 may expect that the attribute 504 be properly formatted when provided in the input object 502. To generate the fuzzing payload 506, the device 104 may provide incorrectly formatted information for the attribute 504. For example, an attribute 504 may be an email address. The device 104 may generate the fuzzing payload 506 by providing an incorrectly formatted email address as the value for that attribute 504 to test the response of the function 114 to an incorrectly formatted attribute 504.

After the device 104 generates the fuzzing payload 506, the device 104 injects the fuzzing payload 506 into a test object 508. The test object 508 may resemble the expected input object 502 except certain aspects of the test object 508 differ from the expected input object 502 of the function 114. As another example, the test object 508 may include an incorrectly formatted attribute 504. Stated differently, the test object 508 deviates from the expected input object 502 in certain ways to test the response of the function 114 to the deviations.

Figure 6:
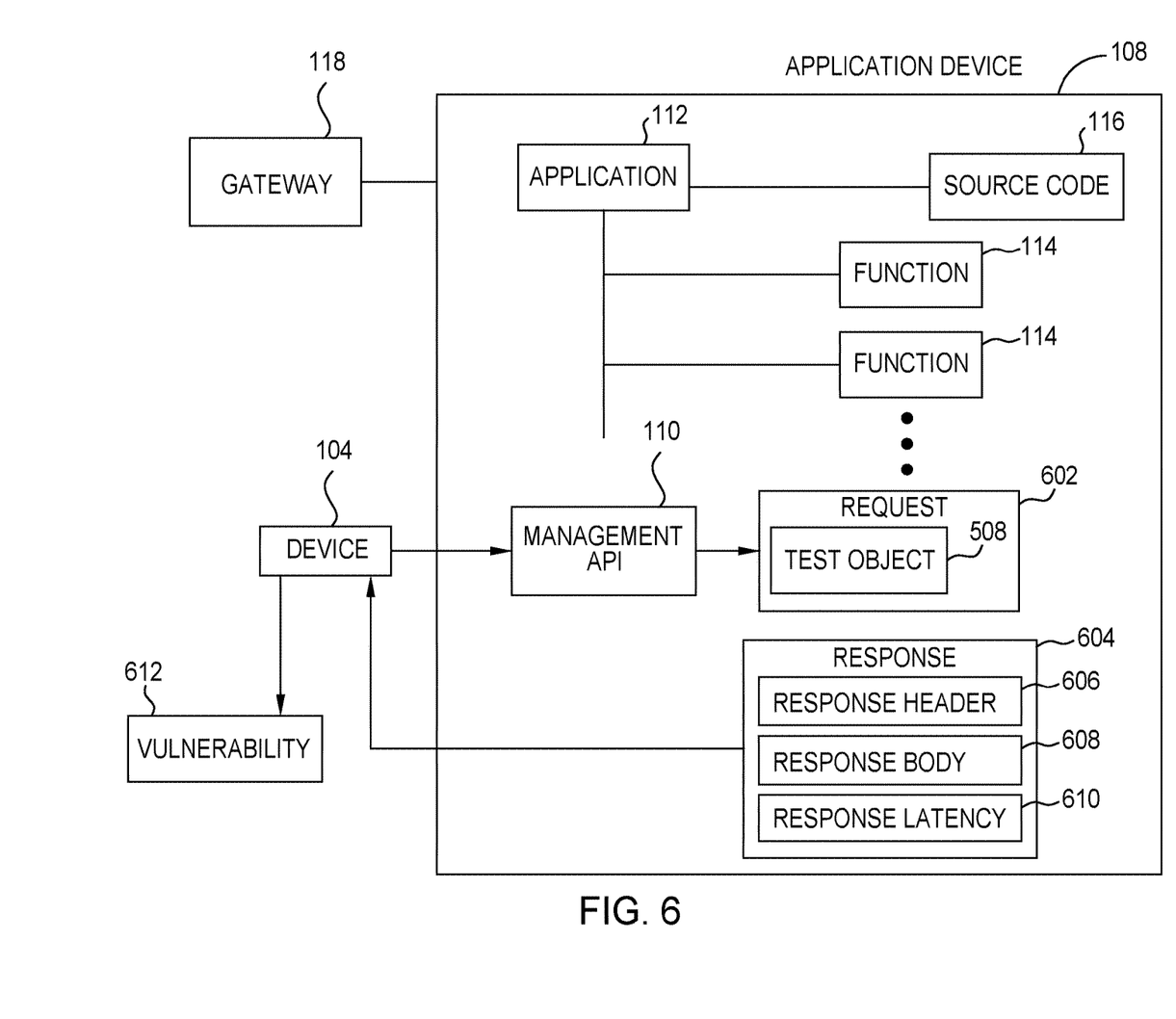
FIG. 6 illustrates an example device and application device testing or verifying a function in the system of FIG. 1.

FIG. 6 illustrates an example device 104 and application device 108 testing or verifying a function 114 in the system 100 of FIG. 1. Generally, the actions or features shown in FIG. 6 are performed after the device 104 generates the test object 508 (shown in FIG. 5). To test the function 114, the device 104 communicates a fuzzing payload to invoke the function 114. The device 104 then analyzes the response of the function 114 to the fuzzing payload to detect vulnerabilities in the function 114.

As seen in FIG. 6, the device 104 communicates a request 602 to the application device 108 using the management API 110. For example, a user 102 may input a command into the device 104, and in response, the device 104 generates and communicates the request 602 to the application device 108 via the management API 110. As a result, the request 602 bypasses the API gateway 118. The request 602 may include a request to invoke a function 114. Additionally, the request 602 includes the test object 508 generated by the device 104. The test object 508 may include the fuzzing payload 506 (shown in FIG. 5) that includes the malformed or unexpected input. The application device 108 may receive the request 602 and invoke the function 114. The application device 108 may also provide the test object 508 to the function 114 when invoking the function 114.

The function 114 then executes using the provided test object 508. For example, the function 114 may execute its coded functions or features using the test object 508. Because the test object 508 includes malformed or unexpected inputs, the function 114 may experience errors when executing using the test object 508. For example, the function 114 may return error messages or even crash.

The application device 108 generates a response 604 to the request 602. The response 604 includes the results of the execution of the function 114 using the provided test object 508. As seen in FIG. 6, the response 604 includes a response header 606, a response body 608, and a response latency 610. Each of the response header 606, response body 608, and the response latency 610 may be used to determine how the function 114 performed with the provided test object 508. The application device 108 communicates the response 604 back to the device 104. The device 104 may analyze the response header 606, response body 608, and response latency 610 to determine a vulnerability 612 in the function 114. For example, the response header 606, the response body 608, and the response latency 610 may include error messages, stack traces, or timeout indicators that suggest a security vulnerability 612 exists in the function 114. The device 104 may detect the vulnerability 612 in the function 114 and provide or undertake remedial actions to correct the vulnerability 612.

In some embodiments, the response body 608 includes status codes, error messages, and stack traces that indicate errors that occurred when the function 114 executed. The device 104 may analyze the response body 608 to determine these errors. For example, the presence of error messages or stack traces may be indicative of an error caused by the test object 508. As another example, certain status code values may indicate an error caused by the test object 508. In certain embodiments, the response header 606 may include logs that reveal errors caused by the test object 508. For example, the logs may indicate errors that occurred during invocation of the function 114. In particular embodiments, the response latency 610 may be used to identify an error condition or crash caused by the test object 508. For example, a high response time (e.g., a response time exceeding a threshold) indicated in the response latency 610 may suggest a resource consumption vulnerability, resulting in denial of service or excessive usage.

In certain embodiments, the response latency 610 is not included in the response 604. Rather, the device 104 (or the application device 108) determines the response latency 610 by determining how much time it takes for the response 604 to be received from the application 112. A high response time (e.g., a response time exceeding a threshold) may suggest a resource consumption vulnerability, resulting in denial of service or excessive usage.

As a result, the device 104 generates fuzzing payloads 506 for the test object 508 after parsing or analyzing the source code 116 for the function 114. In this manner, the device 104 generates better fuzzing payloads 506 and test objects 508 that provide improved test coverage of the function 114. As a result, the device 104 may detect vulnerabilities 612 that existing fuzzing techniques may miss. Specifically, because the device 104 generates the fuzzing payload 506 and the test object 508 using knowledge of the source code 116 of the function 114, the fuzzing payload 506 and the test object 508 may include attributes 504 or values that are actually unexpected by the function 114. As a result, the device 104 provides better test coverage and increases the likelihood that the vulnerability 612 is detected.

In some embodiments, the response 604 includes a trace identifier that the device 104 extracts for future use. For example, the device 104 may use the trace identifier to query the application device 108 or other application devices 108 in the cloud to retrieve logs from other services (e.g., databases, storage services, other applications 112, other functions 114, etc.) that were invoked by the function 114 under test. Importantly, the trace identifier and the ability to retrieve downstream logs is available through the management API 110 but may not be available through the gateway API 118.

Figure 7:
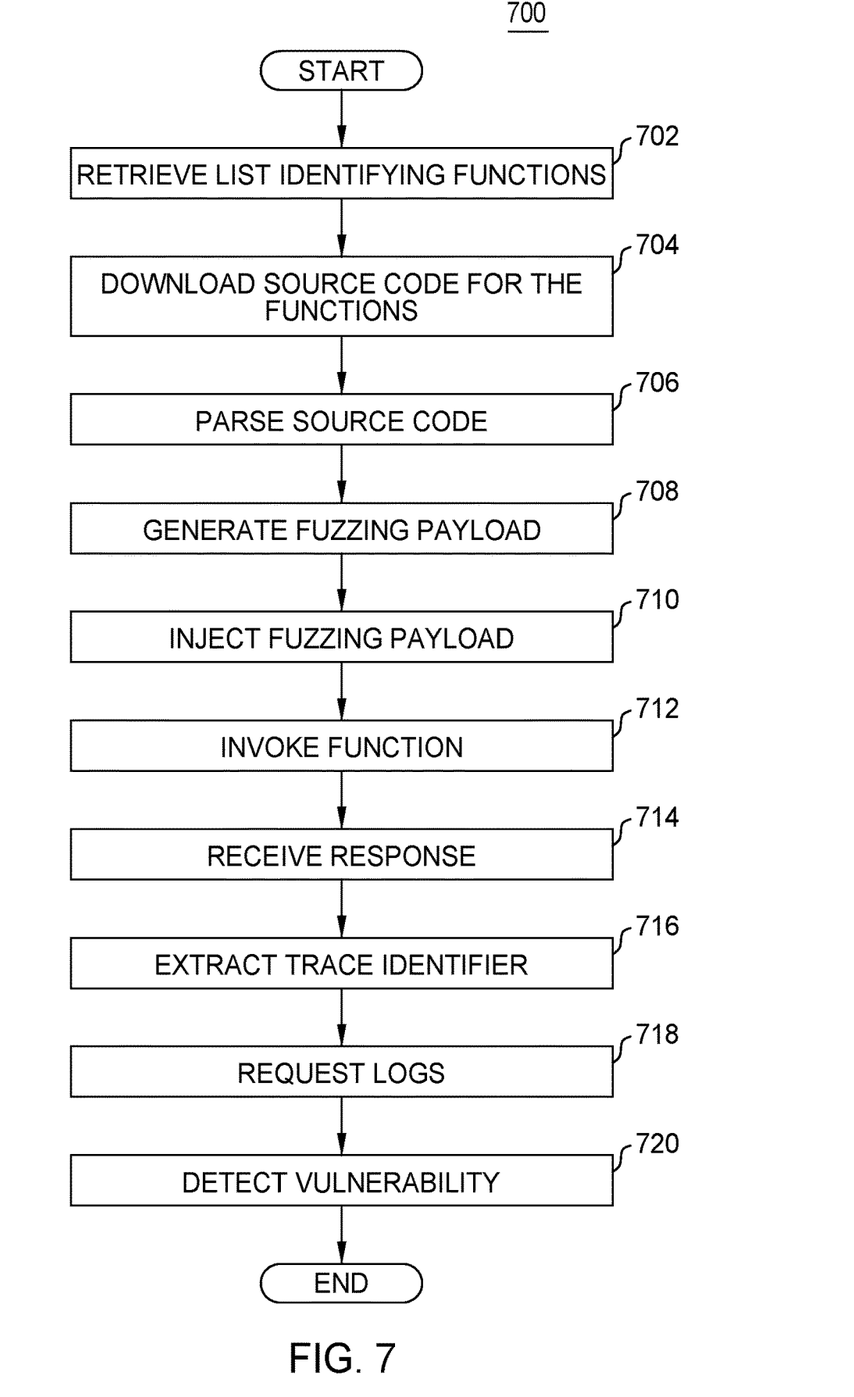
FIG. 7 is a flowchart of an example method to test or verify an application performed in the system of FIG. 1.

FIG. 7 is a flowchart of an example method 700 to test or verify an application 112 performed in the system 100 of FIG. 1. In certain embodiments, various components of the system 100 perform the method 700. By performing the method 700, better test coverage of the application 112 is provided, which allows for certain vulnerabilities 612 to be detected when those vulnerabilities 612 may have been missed by existing testing techniques, in certain embodiments.

At 602 the device 104 retrieves a list 204 identifying the functions 114 supported or exposed by the application 112. The device 104 may have communicated the request 202 to the application device 108 using the management API 110 to bypass the API gateway 118. The request 202 may identify the application 112. In response to the request 202, the application device 108 generates and returns the list 204 that identifies the functions 114 supported or exposed by the application 112. In some embodiments, the list 204 may identify every function 114 supported by the application 112, including functions 114 that are typically not exposed by the API gateway 118. The application device 108 communicates the list 204 back to the device 104.

At 704, the device 104 downloads the source code 116 for some of the functions 114 of the application 112. After the device 104 receives the list 204 identifying the functions 114 supported or exposed by the application 112, the device 104 generates and communicates a request 302 to the application device 108 using the management API 110. As a result, the request 302 bypasses the API gateway 118. The request 302 identifies the functions 114 from the list 204 that should be tested. In response to the request 302, the application device 108 generates and communicates the response object 304 back to the device 104. The response object 304 may include information about the functions 114 identified in the request 302. For example, the response object 304 may include the code handler 306 and the code location 308 for the functions 114 identified in the request 302. The device 104 may then request the source code 116 for the functions 114 using the code locations 308 in the response object 304. For example, the device 104 may communicate a request 402 for the source code 116 to the code locations 308 indicated in the response object 304. The device 104 then retrieves and downloads the source code 116 for the functions 114.

At 706, the device 104 parses the source code 116 to determine one or more input objects 502 expected by the functions 114. The input objects 502 may include one or more attributes 504. The device 104 may identify the input objects 502 and their attributes 504 by identifying certain syntax or notations in the source code 116. For example, the device 104 may identify input objects 502 and attributes 504 based on dot notation, where a period separates the name of an input object 502 and the name of an attribute 504, or bracket notation, where brackets separate the name of an input object 502 and the name of an attribute 504. In this manner, the device 104 identifies the input objects 502 and their attributes 504 that the functions 114 expect to receive when the functions 114 are invoked.

At 708, the device 104 generates the fuzzing payload 506 using the identified input objects 502 and attributes 504. The fuzzing payload 506 includes malformed or unexpected inputs. Stated differently, the fuzzing payload 506 includes information that deviates from the input object 502 and its attributes 504 expected by the functions 114 when the functions 114 are invoked. For example, if an attribute 504 is a string datatype, then the fuzzing payload 506 may use an integer datatype instead for that attribute 504. As another example, if an attribute 504 has a particular format (e.g., an email address), then the fuzzing payload 506 may include an incorrect format for the attribute 504.

At 710, the device 104 injects the fuzzing payload 506 into a test object 508. The test object 508 may resemble the input object 502 expected by the functions 114 except the test object 508 now includes the malformed or unexpected inputs for some of the attributes 504. At 712, the device 104 invokes a function 114 using the test object 508. The device 104 may communicate the request 602 to the application device 108 through the management API 110. As a result, the request 602 bypasses the API gateway 118. The request 602 includes the test object 508. The request 602 may also identify the function 114 to be invoked. The application device 108 invokes the function 114 in response to receiving the request 602. The application device 108 also provides the test object 508 to the function 114. The function 114 then executes using the provided test object 508.

The application device 108 generates the response 604 that includes the results of executing the function 114. In some embodiments, the response 604 includes the response header 606, the response body 608, and the response latency 610. The application device 108 communicates the response 604 back to the device 104. At 714, the device 104 receives the response 604.

The device 104 may extract a trace identifier from the response 604 at 716. The trace identifier may be used by the device 104 to retrieve logs from downstream services (e.g., databases, storage services, other applications 112, other functions 114, etc.) that were invoked by the function 114 under test. The device 104 may request these logs at 718. The trace identifier and the ability to request these downstream logs may be available through the management API 110 but not through the gateway API 118. In some embodiments, the steps 716 and 718 may not be performed.

The device 104 analyzes the response 604 to detect one or more vulnerabilities 612 at 720. For example, the device 104 may analyze any error messages, stack traces, or timeouts indicated by the response 604 to detect a vulnerability 612 in the function 114. The vulnerability 612 may be of any suitable type. For example, the vulnerability 612 may be a security vulnerability that is detected by passing the fuzzing payload 506 to the function 114. After detecting the vulnerability 612, the device 104 may suggest or take remedial action to fix the vulnerability 612.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method of verifying an application, the method comprising:
communicating, to an application device, a request for source code for a first function of an application hosted on the application device, wherein the request bypasses an application programming interface (API) gateway that would otherwise reject the request due to the first function being unexposed by the API gateway;
downloading the source code for the first function from the application device;
injecting a first fuzzing payload into an input object of the first function to generate a test object;
invoking the first function using the test object; and
generating a response to invoking the first function using the test object, wherein the response comprises at least one of an error message, a stack trace, or a timeout indicator that indicates a vulnerability in the first function.

2. The method of claim 1, wherein downloading the source code and invoking the first function using the test object are initiated through a management API rather than through the API gateway that exposes the first function.

3. The method of claim 1, further comprising:
retrieving a list identifying a plurality of functions exposed by the application; and
downloading source code for the plurality of functions, wherein downloading the source code for the first function is performed when downloading the source code for the plurality of functions.

4. The method of claim 1, wherein downloading the source code for the first function comprises:
communicating a request for information about the first function;
receiving a response object to the request, wherein the response object comprises a code location; and
requesting the source code for the first function from the code location.

5. The method of claim 1, wherein determining the input object comprises detecting the input object identified in the source code using dot notation or bracket notation.

6. The method of claim 1, further comprising:
determining an attribute of the input object and a first type for the attribute; and
generating the first fuzzing payload by setting the attribute in the first fuzzing payload as a second type different from the first type.

7. The method of claim 1, wherein the response to invoking the first function using the test object comprises a response body, a response header, and a response latency, and wherein determining whether the first function includes a vulnerability is based on one or more of the response body, the response header, and the response latency.

8. The method of claim 1, further comprising:
determining a second function called by the first function based on analyzing the response to invoking the first function using the test object; and
invoking the second function using a second fuzzing payload.

9. A system for verifying an application, the system comprising:
a memory; and
a processor communicatively coupled to the memory, the processor configured to:
retrieve a list identifying a plurality of functions exposed by the application;
communicate, to an application device, a request for source code for a plurality of functions of an application hosted on the application device, wherein the request bypasses an API gateway that would otherwise reject the request due to the plurality of functions being unexposed by the API gateway;
download the source code for the plurality of functions from the application device;
inject a first fuzzing payload into an input object of a first function of the plurality of functions to generate a test object;
invoke the first function using the test object; and
generate a response to invoking the first function using the test object, wherein the response comprises at least one of an error message, a stack trace, or a timeout indicator that indicates a vulnerability in the first function.

10. The system of claim 9, wherein downloading the source code and invoking the first function using the test object are initiated through a management API rather than through the API gateway that exposes the first function.

11. The system of claim 9, wherein downloading the source code for the first function comprises:
communicating a request for information about the first function;
receiving a response object to the request, wherein the response object comprises a code location; and
requesting the source code for the first function from the code location.

12. The system of claim 9, wherein determining the input object comprises detecting the input object identified in the source code using dot notation or bracket notation.

13. The system of claim 9, wherein the processor is further configured to:
determine an attribute of the input object and a first type for the attribute; and
generate the first fuzzing payload by setting the attribute in the first fuzzing payload as a second type different from the first type.

14. The system of claim 9, wherein the response to invoking the first function using the test object comprises a response body, a response header, and a response latency, and wherein determining whether the first function includes a vulnerability is based on one or more of the response body, the response header, and the response latency.

15. The system of claim 9, wherein the processor is further configured to:
determine a second function called by the first function based on analyzing the response to invoking the first function using the test object; and
invoke the second function using a second fuzzing payload.

16. A non-transitory, computer readable medium storing instructions that, when executed, cause a processor to:
communicate, to an application device, a request for source code for a plurality of functions of an application hosted on the application device, wherein the request bypasses an API gateway that would otherwise reject the request due to the plurality of functions being unexposed by the API gateway;
download source code for the plurality of functions exposed by the application from the application device;
inject a first fuzzing payload into an input object of a first function of the plurality of functions to generate a test object;

invoke the first function using the test object; and generate a response to invoking the first function using the test object, wherein the response comprises a response body, a response header, and a response latency, and wherein at least one of the response body, the response header, and the response latency comprise at least one of an error message, a stack trace, or a timeout indicator that indicates a vulnerability in the first function.

17. The medium of claim 16, wherein downloading the source code and invoking the first function using the test object are initiated through a management API rather than through the API gateway that exposes the first function.

18. The medium of claim 16, wherein the instructions further cause the processor to retrieve a list identifying a plurality of functions exposed by the application, wherein downloading the source code for the plurality of functions is based on the list.

19. The medium of claim 16, wherein downloading the source code for the first function comprises:

communicating a request for information about the first function;

receiving a response object to the request, wherein the response object comprises a code location; and requesting the source code for the first function from the code location.

20. The medium of claim 16, wherein determining the input object comprises detecting the input object identified in the source code using dot notation or bracket notation.

* * * * *